US011305594B2

(12) United States Patent
Kempf

(10) Patent No.: US 11,305,594 B2
(45) Date of Patent: Apr. 19, 2022

(54) SYSTEM FOR MEASURING AT LEAST ONE PHYSICAL CHARACTERISTIC FOR A TYRE ASSEMBLY

(71) Applicant: KEMLAIR, Tulle (FR)

(72) Inventor: Christian Kempf, Toulouse (FR)

(73) Assignee: KEMLAIR, Tulle (FR)

( * ) Notice: Subject to any disclaimer, the term of this patent is extended or adjusted under 35 U.S.C. 154(b) by 0 days.

(21) Appl. No.: 17/310,479

(22) PCT Filed: Jan. 30, 2020

(86) PCT No.: PCT/EP2020/052301
§ 371 (c)(1),
(2) Date: Aug. 5, 2021

(87) PCT Pub. No.: WO2020/160997
PCT Pub. Date: Aug. 13, 2020

(65) Prior Publication Data
US 2022/0041020 A1    Feb. 10, 2022

(30) Foreign Application Priority Data
Feb. 8, 2019 (FR) ..................................... 1901286

(51) Int. Cl.
*B60C 23/04* (2006.01)
(52) U.S. Cl.
CPC ...... *B60C 23/0408* (2013.01); *B60C 23/0498* (2013.01)
(58) Field of Classification Search
CPC ........................ B60C 23/0408; B60C 23/0498

USPC .......................... 340/438, 442, 445, 447, 432
See application file for complete search history.

(56) References Cited

U.S. PATENT DOCUMENTS

| 4,734,674 A * | 3/1988 | Thomas | B60C 23/0408 340/447 |
| 5,731,516 A | 3/1998 | Handfield et al. | |
| 7,458,256 B1 * | 12/2008 | Lin | B60C 23/0408 152/415 |

(Continued)

FOREIGN PATENT DOCUMENTS

| EP | 1447243 A1 | 8/2004 |
| EP | 2206614 A1 | 7/2010 |

*Primary Examiner* — Eric Blount
(74) *Attorney, Agent, or Firm* — Greenberg Traurig, LLP

(57) ABSTRACT

The invention relates to a system (1) for measuring at least one physical characteristic for a pneumatic assembly (21), comprising a device (9) for detecting the physical characteristic, a device (11) for wireless transmission of values representing the measurements obtained by the detection device (9), a one-way fluid passage device (13) for inflating the pneumatic assembly (21), and a source (15) of electrical energy. According to the invention, the measuring system (1) comprises an electrically conductive metal body (3) closed by a cover (5) made of material transparent to the waves of the wireless transmission device (11), allowing the body (3) to be used as a receptacle which provides for stable positioning, the transmission of electrical energy, and the mechanical protection of the devices (9, 11) of the measuring system (1) while allowing wireless transmission through the cover (5) of values representing the measurements obtained by the detection device (9).

11 Claims, 1 Drawing Sheet

(56) References Cited

U.S. PATENT DOCUMENTS

2004/0155785 A1* 8/2004 Okubo ............... B60C 23/0494
340/626
2012/0235809 A1* 9/2012 Cantarelli .......... B60C 23/0452
340/445

* cited by examiner

SYSTEM FOR MEASURING AT LEAST ONE PHYSICAL CHARACTERISTIC FOR A TYRE ASSEMBLY

RELATED APPLICATIONS

The present application is a national phase filing under 35 USC 371 of International Application No. PCT/EP2020/052301, filed on Jan. 30, 2020, which claims priority to France Application No. 1901286, filed on Feb. 8, 2019, the entire contents and disclosures of which are hereby incorporated by reference.

TECHNICAL FIELD OF THE INVENTION

The invention relates to a system for measuring at least one physical characteristic, such as pressure and/or temperature, for a pneumatic assembly, which allows the monitoring of the operating state of the pneumatic assembly. The measuring system according to the invention is particularly suitable for pneumatic assemblies intended for vehicles with two or three wheels, whether they are motorized or not.

TECHNICAL BACKGROUND OF THE INVENTION

Devices for monitoring the pressure of pneumatic assemblies, which are now legally required in certain locations, are already known in the field of passenger vehicles. These known devices comprise an inflation valve which is mounted in the hole in a rim and on which a plastic housing enclosing the battery-powered pressure sensor is provided. Since the sensor is inside the closed space formed by the rim and a pneumatic tire, it can determine the pressure of the closed space to transmit it to the vehicle's on-board network.

These devices are not yet compulsory for motorized cycles, i.e. vehicles with two or three wheels such as motorcycles, mopeds, or three-wheeled motorcycles (sometimes called "trikes"). The devices currently known for monitoring the pressure of pneumatic assemblies for these two- or three-wheeled vehicles are in fact pressure monitoring devices for pneumatic assemblies for passenger vehicles adapted to be fitted to the smaller size of rims for two- or three-wheeled vehicles.

Such adaptations to smaller rims may not be possible because the plastic housings of the monitoring devices used for passenger vehicles are too large, which makes pressure monitoring impossible for rims which are too small.

SUMMARY OF THE INVENTION

The aim of the invention is in particular to provide a new type of system for measuring at least one physical characteristic such as pressure and/or temperature for a pneumatic assembly, the compactness of which allows it to be adapted even to pneumatic assemblies with very small rims and the simplicity of which makes it possible to reduce manufacturing costs while maintaining performance equivalent to current devices for monitoring the pressure of pneumatic assemblies of passenger vehicles.

To this end, the invention relates to a system for measuring at least one physical characteristic for a pneumatic assembly, comprising a device for detecting the physical characteristic, a device for wireless transmission of values representing the measurements obtained by the detection device, a one-way fluid passage device for inflating the pneumatic assembly, and an electrical energy source, characterized in that the measuring system comprises an electrically conductive metal body closed by a cover made of material transparent to the waves of the wireless transmission device, allowing the body to be used as a receptacle which provides for stable positioning, the transmission of electrical energy, and the mechanical protection of the devices of the measuring system while allowing wireless transmission through the cover of values representing the measurements obtained by the detection device.

Surprisingly, it has been found that a metal material can be used for the body, despite a prejudice in the field against the use of metal parts so as not to disturb the operation of the wireless transmission device. According to the invention, the values representing the measurements obtained by the detection device can advantageously and surprisingly be transmitted by electromagnetic waves through the cover without significant attenuation compared with current devices for monitoring the pressure of pneumatic assemblies of passenger vehicles, despite the proximity of the metal body.

The metal body, which has a high rigidity, is also advantageously used as a protective casing for the members of the measuring system according to the invention. In particular during the stages of mounting and demounting of a pneumatic tire, said tire can come into contact with the measuring system by exerting stress to a greater or lesser degree. The metal body therefore provides a very high resistance to deformation, in particular by shearing, which is even higher as the body is very compact and either does not protrude or protrudes only slightly beyond the recess (sometimes called "well") of the rim.

Finally, the body is preferably used as an element for transmitting electrical energy between the electrical energy source and the devices of the measuring system. Some of the electrical connections can therefore be established by the body itself in this way. The measuring system thus has fewer components and is therefore more compact and more economical to manufacture.

The measuring system may also comprise one or more of the following optional features, alone or in combination.

The detection device may comprise at least one sensor powered by the electrical energy source for measuring the physical characteristic. The measured physical characteristic may be a pressure and/or a temperature of the interior space of the pneumatic assembly.

The body may comprise a bottom with a recess in order to compensate for the expansion of the electrical energy source. Depending on the driving conditions of the vehicle on which the measuring system is mounted, the system may be subjected to a temperature increase which may cause expansion, in particular of the energy source. The recess preferably forms a gap of at least 0.1 mm between the electrical energy source and the body.

The wireless transmission device can comprise an electromagnetic wave generator powered by the electrical energy source. The wireless transmission device may also comprise at least one antenna capable of emitting the generated electromagnetic waves outside the measuring system through the cover.

Preferably, according to the invention, at least one part of the antenna is surrounded by the body and at least one other part is surrounded by the cover. The dimensions and positioning of the body and of the antenna, in particular with respect to one another, i.e. in particular the penetration of the antenna into the body, make it possible to optimize the quality of the emission of the wireless transmission device. The part of the antenna surrounded by the body thus preferably extends over a height of less than or equal to 7 mm. The antenna can be mounted around the electronics of the measuring system in order to provide the highest possible maximum antenna height, i.e. the part of the antenna surrounded by the cover can extend near the cover, or even be placed against a face of the cover or embedded in the cover, i.e. can be inaccessible without breaking the cover.

The cover may further comprise at least one pillar intended to hold the electrical energy source against the body in order to better hold the elements of the measuring system together.

The invention also relates to a pneumatic assembly comprising a pneumatic tire fitted to a rim and a pressure measuring system mounted on the rim in order to monitor at least one physical characteristic of the pneumatic assembly, characterized in that the measuring system is as described above.

The pneumatic assembly may also comprise one or more of the following optional features, taken alone or in combination.

The measuring system may further comprise a device for fixing the body in a recess in the rim in order to rigidly connect the pneumatic assembly and the measuring system of the invention.

According to a first embodiment, the fixing device is integral with the body and is an extension of the body such that it projects from the rim to allow the measuring system to be rigidly connected to the rim while allowing the pneumatic assembly to be inflated by means of the measuring system.

According to a first embodiment, the rim is rigidly connected between the body and the fixing device while allowing inflation of the pneumatic assembly by the measuring system. This installation is preferred when the geometry of the rim imposes a bend on the one-way fluid passage device allowing inflation of the pneumatic assembly, i.e. prevents its exit in a straight line.

BRIEF DESCRIPTION OF THE DRAWINGS

Other details and advantages of the invention can be found in the description below, which is for illustrative purposes only and is in no way limiting, with reference to the appended drawings, in which.

DETAILED DESCRIPTION OF AT LEAST ONE EMBODIMENT OF THE INVENTION

Identical or similar elements are denoted by the same reference signs in all the drawings, possibly with the addition of a subscript character. The description of the structure and function of these elements is therefore not always repeated.

"Pneumatic assembly 21" should be understood to mean all types of complete wheel formed by a rim 23 mounted on a vehicle and enclosed by a pneumatic tire (not shown) so as to form an interior space 22 which is inflated by a pressurized gas such as air or nitrogen.

"Pneumatic tire" is intended to mean all types of elastic tires subjected to internal pressure.

The invention applies to all types of pneumatic assemblies 21, in particular those intended for motor vehicles of the passenger car type, SUVs (sport utility vehicles), two-wheeled vehicles (in particular motorcycles), airplanes, industrial vehicles selected from vans, heavy goods vehicles (i.e. subway trains, buses, road transport vehicles such as trucks, tractors, or trailers, off-road vehicles such as agricultural or construction vehicles), or other transport or warehouse vehicles. The invention also applies to non-motorized vehicles such as, in particular, a trailer, a semi-trailer, or a caravan.

Figure 1:
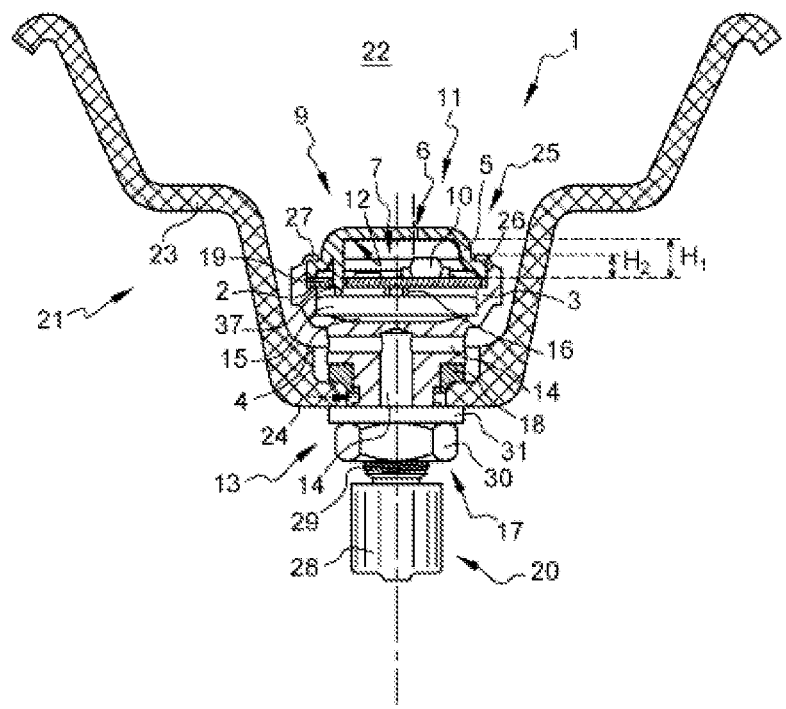
FIG. 1 is a schematic cutaway view of a measuring system according to a first embodiment of the invention on a pneumatic assembly rim.
Figure 2:
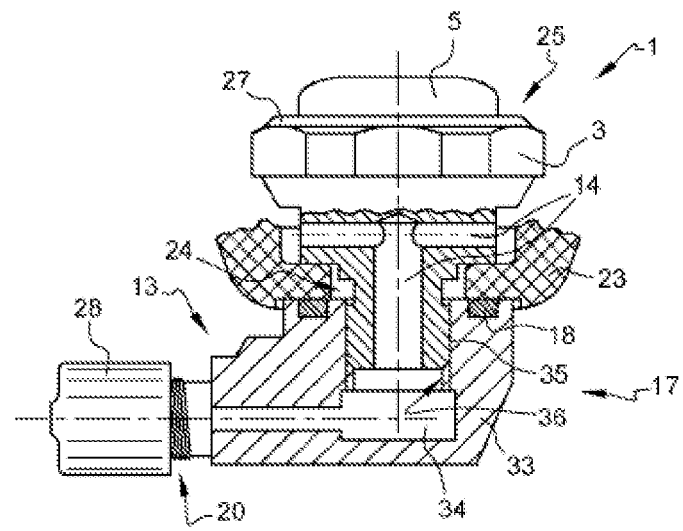
FIG. 2 is a schematic cutaway view of a measuring system according to a second embodiment of the invention on a pneumatic assembly rim.

The aim of the invention is in particular to provide a new type of system 1 for measuring at least one physical characteristic such as pressure and/or temperature for a pneumatic assembly. As shown in FIGS. 1 and 2, the measuring system 1 mainly comprises a body 3 closed by a cover 5. According to the invention, the body 3 is formed by a metal material which makes it in particular very robust and not very deformable. In the examples shown in FIGS. 1 and 2, it can be seen that the body 3 forms a rotationally symmetrical part which allows for a very low manufacturing cost. The body 3 comprises a recess 7 in which the members of the measuring system 1 are accommodated and which is closed by the cover 5. The metal body 3 can be made of steel or aluminum, for example. The body 3 is preferably made of aluminum covered by a protective layer in order to prevent any corrosion of the surfaces in contact with the electrically conductive elements such as an electrical energy source 15 or a substrate 19. The protective layer can be obtained, for example, by a chemical treatment such as nickel plating.

According to the invention, the metal body 3 thus advantageously serves as a receptacle and is used to ensure the correct positioning in a locked manner and the protection of the members of the measuring system 1. In particular during the stages of mounting and demounting of a pneumatic tire, said tire can come into contact with the measuring system 1 by exerting stress to a greater or lesser degree. The metal body 3 therefore provides a very high resistance to deformation, in particular by shearing, which is even higher as the body 3 is very compact and either does not protrude or protrudes only slightly beyond the recess (sometimes called "well") of the rim, which allows a stable position of the members relative to one another in the system.

The measuring system 1 mainly comprises a detection device 9, a wireless transmission device 11, a one-way fluid passage device 13, an electrical energy source 15, and a fixing device 17.

The detection device 9 may comprise at least one sensor 10 powered by the electrical energy source 15 for measuring the physical characteristic. The detection device 9 may typically comprise a substrate 19 such as a wafer made of polymer resin or of a semiconductor material, at least one integrated circuit forming the sensor 10 such as a pressure and/or temperature sensor, for example, being formed on or attached to said wafer. A substrate 19 of this kind is generally protected by a sealant, such as a silicone sealant, which covers it. Moreover, the sensor 10 communicates with the interior space 22 of the pneumatic assembly 21 via an opening 6 in the cover 5.

The wireless transmission device 11 may comprise an electromagnetic wave generator (not shown) powered by the electrical energy source 15. The wireless transmission device may also comprise at least one antenna 12 capable of emitting the generated electromagnetic waves outside the measuring system 1. The electromagnetic waves are preferably at least used to transmit values representing the measurements obtained by the detection device 9. Typically, the wireless transmission device 11 can also use the substrate 19 as described above on which is formed or to which is attached at least one integrated circuit forming the generator (not shown) of electromagnetic waves such as radio waves, for example.

This is why, in order to allow wireless transmission through the cover 5, according to the invention said cover is made of a material transparent to the electromagnetic waves of the wireless transmission device 11, for example a polymer resin or a polymer material. Moreover, the installation of the antenna 12 on the cover 5 allows electromagnetic waves to be emitted as far as possible from the metal body so that said body does not disturb the wireless transmission of the measuring system 1, or disturbs it only slightly.

Indeed, it has surprisingly been found that a metal material can be used for the body 3, despite a technical prejudice in the field against the use of metal parts so as not to disturb the operation of the wireless transmission device 11. According to the invention, the values representing the measurements obtained by the detection device 9 can advantageously and surprisingly be transmitted by electromagnetic waves through the cover 5 without significant attenuation compared with current devices for monitoring the pressure of pneumatic assemblies of passenger vehicles, despite the proximity of the metal body 3.

As can be seen in FIG. 1, the cover 5 is substantially bowl-shaped, i.e. forms a cavity adding to the volume of the recess 7 of the body 3 in order to be able to move the antenna 12 further away from the body 3 and more easily install the devices 9 and 11. Furthermore, in a preferred embodiment, in the cavity of the bowl shape, at least one pillar 37 (only one is visible in FIG. 1) and preferably three pillars 37 protrude, i.e. project, from the bottom of the cavity of the bowl shape in order to hold the electrical energy source 15 against the body 3, passing through or next to the substrate 19.

Preferably, according to the invention, at least one part of the antenna 12 is surrounded by the body 3 and at least one other part is surrounded by the cover 5. The dimensions and positioning of the body 3 and of the antenna 12, in particular with respect to one another, i.e. in particular the penetration of the antenna 12 into the body 3, make it possible to optimize the quality of the emission of the wireless transmission device 11.

As shown in FIG. 1, the antenna 12 is preferably mounted around the devices 9 and 11 (i.e. around the electronics) of the measuring system 1 in order to provide as great a width and height $H_1$ of the antenna 12 as possible, i.e. the greatest possible internal area of the antenna 12. The antenna 12, for example of the loop type, can thus be connected to two opposite ends of a face of the substrate 19 and the part of the antenna 12 surrounded by the cover 5 can extend close to the cover 5 or even be in contact with the cover 5. According to a variant explained below, the antenna 12 can, for example, be placed against a face of the cover 5 or even embedded in the cover 5, i.e. can be inaccessible without breaking the cover 5.

The part of the antenna surrounded by the body 3 thus preferably extends over a height $H_2$ less than or equal to 7 mm with respect to the plane of the substrate 19 to which the antenna 12 is electrically connected in order to provide a sufficiently large internal area of the antenna 12 while maintaining a very compact body 3 so as not to protrude beyond the recess (sometimes called "well") of the rim, or so as to protrude only slightly beyond said recess. Even more preferably, it has been found that a height $H_2$ of at most 3 mm for a height $H_1$ of at least 5 mm surprisingly allows transmission without significant attenuation compared with current devices for monitoring the pressure of pneumatic assemblies of passenger vehicles, despite the proximity of the metal body 3.

According to a preferred variant, the antenna 12 is mounted against a face of the cover 5. More precisely, in the example shown in FIG. 1, the antenna 12 is mounted against the internal face of the cover 5 facing the recess 7 of the body 3. The antenna 12 is preferably placed against the cover 5, for example, by screen printing in a predetermined pattern of low thickness. The pattern can thus form a loop, for example annular or polygonal, or a spiral or labyrinth pattern.

Of course, according to another variant, the antenna 12 could be on another face of the cover 5, for example against the external face of the cover 5 facing the interior space 22 of the pneumatic assembly 21 or even embedded in the cover 5, i.e. inaccessible without breaking the cover 5.

The cover 5 and the body 3 comprise at least one fastening device 25 for rigidly interconnecting them. The fastening device 25 could therefore be of the screw, press-fit, crimp, bayonet, or snap-fit type, for example. In the example shown in FIG. 1, the shoulder 26 of the cover 5 is crimped by being pressed as a result of the deformation of at least one peripheral lip 27 of the body 3. It has been surprisingly shown that the crimped geometry of this peripheral lip 27 made of metal material does not impair the proper operation of the wireless transmission device 11. As will be explained below in more detail, the fastening device 25 completes the assembly of the measuring system 1 by allowing geometric adaptation to the pre-assembly dispersion of the measuring system 1, in particular due to the preferable deformation of each pillar 37 of the cover 5 against the electrical energy source 15.

Advantageously, according to the invention, the fastening device 25 can also make it possible, in the preferred variant of the antenna 12 shown in FIG. 1, to press the peripheral edge of the cover 5 comprising the shoulder 26 against the substrate 19 in order to ensure the electrical connection of the antenna 12 to the rest of the wireless transmission device 11 on the substrate 19 without the need for additional electrical contacts such as plates or wires.

On its opposite side, the substrate 19 is connected to one of the terminals of the electrical energy source 15 by a geometric compensation element 16. The other terminal of the electrical energy source 15 is preferably connected, via contact with the substrate 19, to the shoulder 2 of the recess 7 of the body 3 in order to supply the devices 9 and 11 with energy. The geometric compensation element 16 may, for example, be a pad of polymer foam loaded with electrically conductive wires or an elastomeric material loaded with electrically conductive particles. According to the invention, some of the electrical connections are preferably made by the body 3 itself. The measuring system 1 thus comprises fewer components and is therefore more compact and more economical to manufacture.

More specifically, the body 3 can thus be electrically conductive and used as an element for transmitting electrical energy between the electrical energy source 15 and the devices 9, 11 of the measuring system via the substrate 19 and/or the compensation element 16 while allowing the wireless transmission of values representing the measurements obtained by the detection device 9. Of course, at least one electrically conductive element (track, wire, plate, etc.) could be used as an alternative to the electrically conductive body 3 as an element for transmitting electrical energy between the electrical energy source 15 and the devices 9, 11 of the measuring system 1 via the substrate 19 and/or the compensation element 16.

According to a first embodiment shown in FIG. 1, the one-way fluid passage device 13 is located in the lower part of the body 3. The device 13 essentially comprises at least one channel 14 and a nonreturn valve 20 for inflating the pneumatic assembly 21 and preventing the deflation of said assembly. Since the valve 20 is of a conventional type for a vehicle pneumatic assembly valve 21, it will not be described in any more detail below. In the example in FIG. 1, the nonreturn valve 20 is capped with a protective cap 28.

According to the first embodiment shown in FIG. 1, the fixing device 17 makes it possible to fasten the body 3 in a recess 24 of the rim 23 in order to rigidly connect the pneumatic assembly 21 to the measuring system 1 of the invention. As can be seen in FIG. 1, the fixing device 17 may comprise at least one sealing element 18 (located between the body 3 and the rim 23 in the example in FIG. 1) intended to ensure maintenance of the pressure of the interior space 22 of the pneumatic assembly 21.

The fixing device 17 in the first embodiment is integral with the body 3 as an extension of the body 3 and is coaxial with a part of the channel 14 so as to project from the rim 23. It is therefore possible to rigidly connect the measuring system 1 to the rim 23 while allowing the pneumatic assembly 21 to be inflated by means of the measuring system 1 via the channel 14. In the example in FIG. 1, the fixing device 17 comprises a thread 29 on the external surface of the body 3 and a nut 30/washer 31 assembly in order to allow rigid connection against the rim 23 of the body 3 using the nut 30/washer 31 assembly by screwing.

A second embodiment shown in FIG. 2 is provided, for example, when it is undesirable for the one-way fluid passage device 13 to be a rectilinear extension of the body 3 of the measuring system 1. This installation can be used e.g. when the geometry of the rim 23 imposes a bend on the one-way fluid passage device 13 allowing inflation of the pneumatic assembly, i.e. prevents its exit in a straight line.

As shown in FIG. 2, the second embodiment comprises a second body 33 attached to a body 3 similar to the first embodiment but truncated from part of its lower region. It is also better visible in FIG. 2 that the body 3 may have at least one shape (flat portions below the lip 27 in the manner of the outer surface of a nut in the case of FIG. 2) intended to improve its grip. The one-way fluid passage device 13 is located in the second body 33. The device 13 essentially comprises at least one second channel 34 and a nonreturn valve 20 for inflating the pneumatic assembly 21 and preventing the deflation of said assembly. In the example in FIG. 2, the nonreturn valve 20 is capped with a protective cap 28.

According to the second embodiment shown in FIG. 2, the fixing device 17 makes it possible to fasten the body 3 in a recess 24 of the rim 23 in order to rigidly connect the pneumatic assembly 21 to the measuring system 1 of the invention. As can be seen in FIG. 2, the fixing device 17 may comprise at least one sealing element 18 (located between the second body 33 and the rim 23 in the example in FIG. 2) intended to ensure maintenance of the pressure of the interior space 22 of the pneumatic assembly 21.

According to the second embodiment, the rim 23 is rigidly connected between the body 3 and the second body 33 with the aid of the fixing device 17 while allowing inflation of the pneumatic assembly 21 by means of the measuring system 1 via the channels 34 and 14. In the example in FIG. 2, the fixing device 17 comprises a thread 35 on the external surface of the body 3 and an internal thread 36 in the second body 33 in order to allow the screwing of the bodies 3 and 33 sandwiched against the rim 23.

The second body 33 may have a geometry thus perfectly suited to the desired installation for the optimum inflation of the pneumatic assembly 21, for example due to a rim geometry which does not allow the first embodiment of the invention to be implemented. However, it is possible for the body 33 not to be bent or generally oblique with respect to the body 3 as in FIG. 2, and instead to be in a rectilinear extension of the body 3 in the manner of the first embodiment, as in the example shown in FIG. 1, but without being integral.

Regardless of the embodiment, the electrical energy source 15 is mounted against the bottom 4 of the recess 7 of the body 3 such that one of the terminals (positive terminal of a button cell battery in the examples in FIGS. 1 and 2) is preferably in direct contact with the body 3 made of electrically conductive metal material. There is preferably a recess (shown in FIG. 1) in the central part of the bottom 4 of the recess 7 of the body 3 in order to compensate for any expansion of the electrical energy source 15. As can be seen in FIG. 1, even with the recess in the bottom 4, the bottom is still separated from the channel 14 by a wall of the body 3. Depending on the driving conditions of the vehicle on which the measuring system 1 is mounted, the system may be subjected to a temperature increase which may cause expansion, in particular of the energy source 15. The recess in the bottom 4 forms a gap of at least 0.1 mm, preferably of at least 0.2 mm, and ideally of 0.5 mm, between the center of the terminal of the electrical energy source 15 (positive in FIG. 1) and the body 3 in order to allow the electrical energy source 15 to expand freely under the effect of an increase in temperature. Via the compensation element 16, this advantageously prevents this expansion from causing deformation of the substrate 19, which would weaken the electronics of the measuring system 1. This also preferably prevents this repeated expansion from deforming the pillar(s) 37 of the cover 5 over time to the point of losing the function of holding and blocking the electrical energy source 15 at the bottom 4 of the body 3.

The devices 9, 11, 13 are then mounted. In the examples in FIGS. 1 and 2, the substrate 19 is mounted in the body 3 and the one-way fluid passage device 13 for the one-way flow of fluid is mounted in the body 3 and the second body 33, respectively. The compensation element 16 comes into contact with the other terminal (negative terminal of a button cell battery in the examples in FIGS. 1 and 2) of the electrical energy source 15 without the substrate 19 resting against the shoulder 2 of the recess 7 of the body 3.

The cover 5 is then mounted on the body 3 using the fastening device 25, preferably passing each pillar 37 through a hole in or next to the substrate 19 in order to cover the recess 7 of the body 3 comprising the devices 9, 11 and the electrical energy source 15. In the examples shown in FIGS. 1 and 2, the shoulder 26 of the cover 5 is crimped by being pressed as a result of the deformation of at least one peripheral lip 27 of the body 3. The fastening device 25 thus completes the assembly of the measuring system 1 by allowing geometric adaptation to the pre-assembly dispersion of each element of the measuring system 1.

Moreover, each free end of the pillars 37 preferably has a plastically and/or elastically deformable portion that also allows adaptation of the stress with which the electrical energy source 15 presses against the body 3 to the pre-assembly dispersion of each element of the measuring system 1. Finally, according to the invention, the fastening device 25 preferably makes it possible to press the peripheral edge of the cover 5 against the substrate 19, to press the peripheral edge of the substrate 19 against the shoulder 2, and to deform the compensation element 16 so as to ensure all the electrical connections of the measuring system 1, such as that of the antenna 12 and that of the electrical energy source 15, without the need for additional electrical contacts such as plates or wires. Therefore, after mounting the cover 5 on the body 3 using the fastening device 25, all the elements of the measuring system 1 are held together in position in a simple and robust manner.

The invention is not limited to the embodiments and variants described here, and other embodiments and variants will be apparent to a person skilled in the art. It is in particular conceivable for the body 3 to be in two parts in order to pre-assemble the cover 5 on an upper part of the body 3 and to assemble the lower part of the body 3 already provided with the electrical energy source 15 and the substrate 19 or the antenna 12 (for example by screwing, bayonet fastening, or snap-fitting). Furthermore, the dimensions and/or shape of the various elements of the measuring system 1 can be modified according to the proposed applications, for example a type of physical characteristic measurement other than pressure or temperature and/or another type of installation in a pneumatic assembly 21 and/or another type of pneumatic assembly 21 such as a gas tank.

The invention claimed is:

1. A measuring system, comprising:
    a detection device configured to detect at least one physical characteristic for a pneumatic assembly;
    a wireless transmission device configured to wirelessly transmit values representing the measurements obtained by the detection device;
    a one-way fluid passage device configured to inflate the pneumatic assembly;
    an electrical energy source;
    an electrically conductive metal body, housing the detection device, the wireless transmission device, the one-way fluid passage device, and the electrical energy source; and
    a cover, closing the electrically conductive metal body;
        wherein the cover is made of material transparent to the waves of the wireless transmission device such that the body is configured to be used as a receptacle configured to provide stable positioning, the transmission of electrical energy, and mechanical protection of the detection device and the wireless transmission device; and
        wherein the cover is configured to allow the values representing the measurements obtained by the detection device to be wirelessly transmitted therethrough.

2. A measuring system according to claim 1, wherein the physical characteristic is at least one of a pressure or a temperature.

3. A measuring system according to claim 1, wherein the wireless transmission device comprises an electromagnetic wave generator powered by the source of electrical energy and at least one antenna capable of emitting the generated electromagnetic waves outside the measuring system through the cover.

4. A measuring system according to claim 3, wherein at least one part of the antenna is surrounded by the body and at least one other part is surrounded by the cover.

5. A measuring system according to claim 4, wherein the at least one part of the antenna surrounded by the body extends over a height of less than or equal to 7 mm.

6. A measuring system according to claim 1, wherein the body comprises a bottom with a recess, wherein the recess is configured to compensate for the expansion of the electrical energy source.

7. A measuring system according to claim 6, wherein the recess forms a gap of at least 0.1 mm between the electrical energy source and the body.

8. A measuring system according to claim 1, wherein the cover comprises at least one pillar intended to press the electrical energy source against the body.

9. A pneumatic assembly, comprising:
    a rim;
    a pneumatic tire fitted to the rim; and
    the pressure measuring system of claim 1;
        wherein the pressure measuring system is mounted on the rim; and
        wherein the pressure measuring system is configured to monitor at least one physical characteristic of the pneumatic assembly.

10. A pneumatic assembly (21) according to claim 9, wherein the measuring system further comprises a device for fixing the body in a recess of the rim, wherein the fixing device is integral with the body and an extension of the body such that the fixing device projects from the rim to allow a rigid connection between the fixing device and the rim while allowing the pneumatic assembly to be inflated by means of the measuring system.

11. A pneumatic assembly according to claim 9, wherein the measuring system further comprises a device for fixing the body in a recess of the rim, wherein the rim is rigidly connected between the body and a second body by means of the fixing device while allowing the pneumatic assembly to be inflated by means of the measuring system.

* * * * *